United States Patent [19]
Berkaloff

[11] Patent Number: 5,673,377
[45] Date of Patent: Sep. 30, 1997

[54] METHOD AND SYSTEM FOR DISPLAYING A REPRESENTATION OF A THREE-DIMENSIONAL OBJECT WITH SURFACE FEATURES THAT CONFORM TO THE SURFACE OF THE THREE-DIMENSIONAL OBJECT

[75] Inventor: Pierre Berkaloff, Mountain View, Calif.

[73] Assignee: Ray Dream, Inc., Mountain View, Calif.

[21] Appl. No.: 300,449

[22] Filed: Sep. 2, 1994

[51] Int. Cl.⁶ .................................................. G06T 11/40
[52] U.S. Cl. ................................................... 395/130
[58] Field of Search ................................. 395/127, 130

[56] References Cited

PUBLICATIONS

Foley, James D., et al, *Computer Graphics: Principles and Practices*, Addison–Wesley Publishing Co., 2nd ed. pp. 251–283, (1990).

*Two–Part Texture Mappings*, by Eric A. Bier and Kenneth R. Sloan, Jr., IEEE, Spe. 1986, pp. 40–53.

*Direct WYSIWYG Painting and Texturing on 3D Shapes*, by Pat Hanrahan and Paul Haeberli, Computer Graphics, vol. 24, No. 4, Aug. 1990, pp. 215222.

*Primary Examiner*—Almis R. Jankus
*Assistant Examiner*—Rudolph J. Buchel
*Attorney, Agent, or Firm*—Gray Cary Ware & Freidenrich

[57] ABSTRACT

Disclosed are a system and method for providing a three-dimensional graphic-user interface operator experience real-time feedback to modification to three-dimensional objects projected onto a computer display screen. Three-dimensional data is modified in surface space and then transformed from surface space to object space and then transformed again so that it can be projected to screen space. In transforming from surface space to object space, the data is characterized so that appropriate steps can be taken to cause the transformation.

4 Claims, 9 Drawing Sheets

METHOD AND SYSTEM FOR DISPLAYING A REPRESENTATION OF A THREE-DIMENSIONAL OBJECT WITH SURFACE FEATURES THAT CONFORM TO THE SURFACE OF THE THREE-DIMENSIONAL OBJECT

FIELD OF THE INVENTION

The present invention relates to a three-dimensional user graphical interface and more particularly relates to a system and method for providing to a user real-time feedback on a display screen corresponding to actions taken by the user on the surface of an object.

BACKGROUND OF THE INVENTION

As early as the 1970s, three-dimensional (3D) rendering systems were able to describe the "appearance" of objects according to parameters. These and later methods provide for the parameterization of the perceived color of an object based on the position and orientation of its surface and the light sources illuminating it. In so doing, the appearance of the object is calculated therefrom. Parameters further include values such as diffuse color, the specular reflection coefficient, the specular color, the reflectivity, and the transparency of the material of the object. Such parameters are globally referred to as the shading parameters of the object.

Early systems could only ascribe a single value to shading parameters and hence they remained constant and uniform across the entire surface of the object. Later systems allowed for the use of non-uniform parameters (transparency for instance) which might have different values over different parts of the object. Two prominent and distinct techniques have been used to describe the values taken by these non-uniform parameters on the various parts of the object's surface: procedural shading and textural mapping. Textural mapping is pixel based and resolution dependent.

Procedural shading describes the appearance of a material at any point of a 1D, 2D or 3D space by defining a function (often called the procedural shader) in this space into shading parameter space. The object is "immersed" in the original 1D, 2D or 3D space and the values of the shading parameter at a given point of the surface of the object are defined as a result of the procedural shading function at this point. Procedural shaders that approximate appearance of wood, marble or other nature materials have been developed and can be found in the literature.

Texture mapping uses a different approach than procedural shading. A raster based picture (the texture map) describing the shading parameter's values is wrapped around the surface of the object much like a decal can be wrapped around an object. At each point of the surface, the shading parameter reads the value stored at the corresponding point on the texture map. Several approaches to texture mapping have been developed. The problem in all these approaches is that a texture map has a fixed resolution and therefore will give a very pixelized look to the appearance of the object when rendered at certain scales. Texture maps are also cumbersome to re-edit.

The problems with both procedural shading and texture mapping is that while both allow the appearance of the object to be non-uniform, they do not provide an easy way to assign variations of the appearance of the object to particular areas of the object's surface. As a consequence, when asked to produce an object whose appearance varies depending on different areas of its surface, operators typically manually decompose the object into a group of simpler objects to which it is easier to assign appearances to individual surfaces.

In using texture mapping, the operator creates a single image map that approximates the appearance of the object's surface as a whole, and through trial and error will map the specific features of the texture map to the relevant (geometric) features of the object. Accordingly, this approach is typically quite laborious. To improve on this approach, work has been done to apply a uniform texture map to the surface of the object and directly modify the image mapped onto the object's surface. This improvement, however, has not removed other inherent limitations in texture mapping, that is the fixed resolution of the map and the need for re-editing.

SUMMARY OF THE INVENTION

According to the present invention, a system and method is provided which allows an operator, in real-time, to paint directly on an object in much the same way an artist would if the artist were holding a sculpture. Moreover, the operator can define resolution independent areas of an object surface and associate a different appearance to each of them. That allows an operator to brush colors, patterns or textures onto the surface of a 3D object and the brush strokes will conform to the most complex surface. For example, an artist can use the present invention to paint color and textures on an irregularly-shaped figure, such as the feathers of a duck, then rotate the model to continue painting the underside.

Moreover, in accordance with the present invention, once the texture map is in place, it can be moved and resized on the surface of the object in real-time. Thus, the frustration of trial and error of the prior art discussed above is eliminated.

The method and system of the present invention allows an operator viewing on a display screen an image generated by 3D graphics information of an object to actually see in real-time the results of actions taken on the surface of the object.

The present invention involves two space transformations. In a first instance, after receiving a first set of data signals representing 3D graphics information defined in surface space, a first transformation of points in surface space to points in object space takes place. In transforming the first set of data signals into a second set of data signals representing the three-dimensional graphics information in object space the object is then projected onto the screen. Thus, after a second transformation, where the second set of data signals is transformed into a third set of data signals representing said three-dimensional information in screen space, the object's surface is viewed on the screen. With the speed of the transformations in accordance with the present invention, an operator views actions taken on the surface of the object almost instantaneously, therefore, providing the ability for real-time manipulation of the appearance of the object's surface.

Through the above described transformations data can be manipulated. For example, on the 3D object's surface, a line can be drawn. The image of the line is then projected onto a display screen for the operator to view. The line projected onto the screen appears to follow the contours of the surface of the 3D object.

Moreover, in accordance with the present invention, different areas on the object's surface are thus definable wherein different appearances or shaders are assigned to each of those areas. The image of an area's contours is then projected onto a display screen for the operator to view in a manner which appears to follow the contours of the surface of the 3D object. The operator is able to manipulate the area, that is, the contour of the area, repositioning it or resize it. When the contour of the area is repositioned or resized, it takes on the contours of the object at the new place on the surface. In this manner, an operator is easily able to move the area to see how it looks in the new position.

BRIEF DESCRIPTION OF THE DRAWINGS

Other objects, and many of the intended advantages of the present invention, will be readily appreciated as the same becomes better understood by reference to the following detailed description when considered in connection with the accompanying drawings wherein.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the claims.

Figure 1:
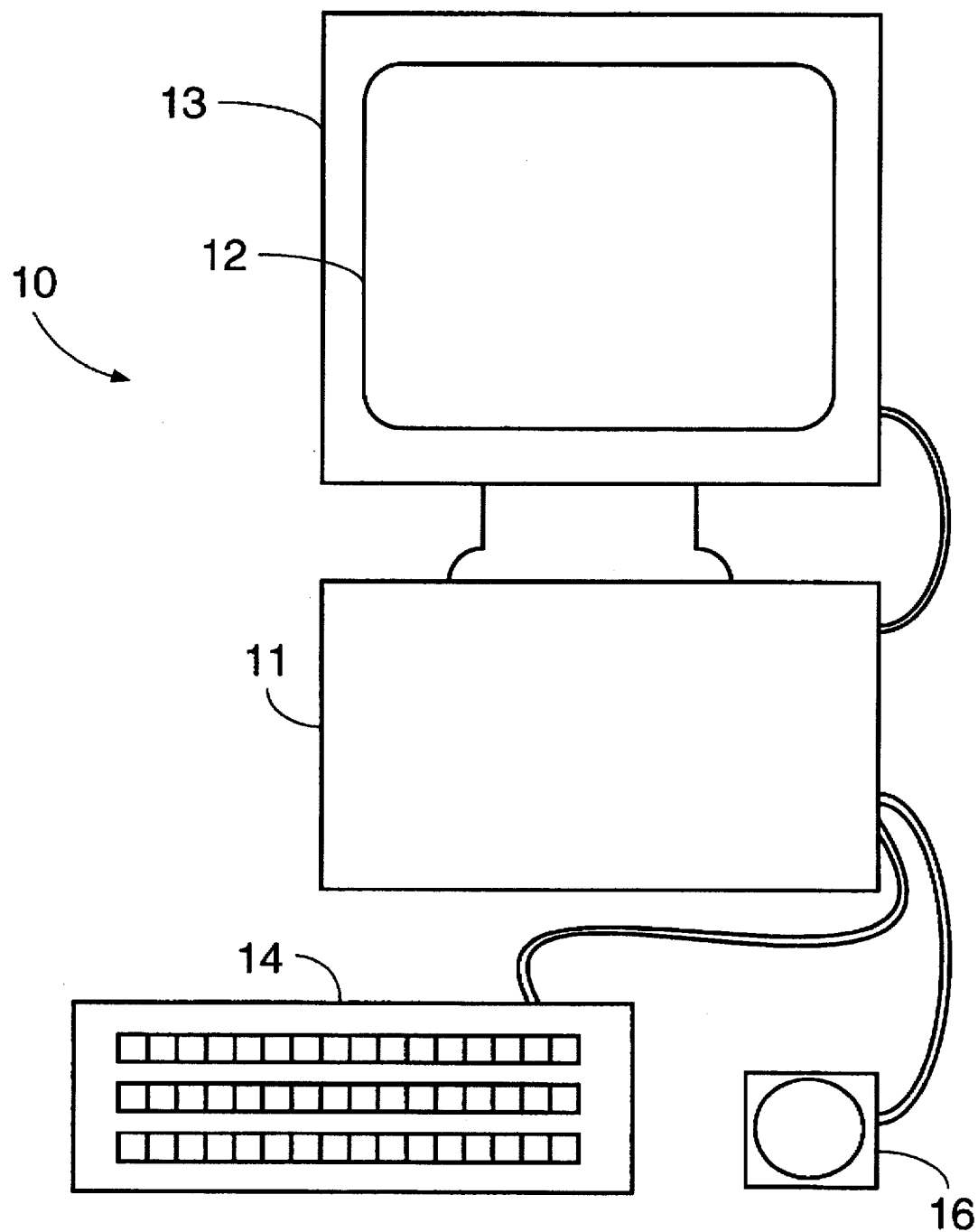
FIG. 1 depicts a computer system capable of running the system and method of the present invention.

FIG. 1 represents a typical personal computer system 10 such as an IBM compatible or an Apple used in accordance with the present invention. A central processing unit (CPU) 11 is in communication with both a display screen 12 which is a part of a display apparatus 13. Moreover, the CPU is in communication with a user input device, such as a keyboard 14 or a trackball or mouse 16. The display screen depicted in FIG. 1 is facing out from the page so a user can view the screen.

Figure 2:
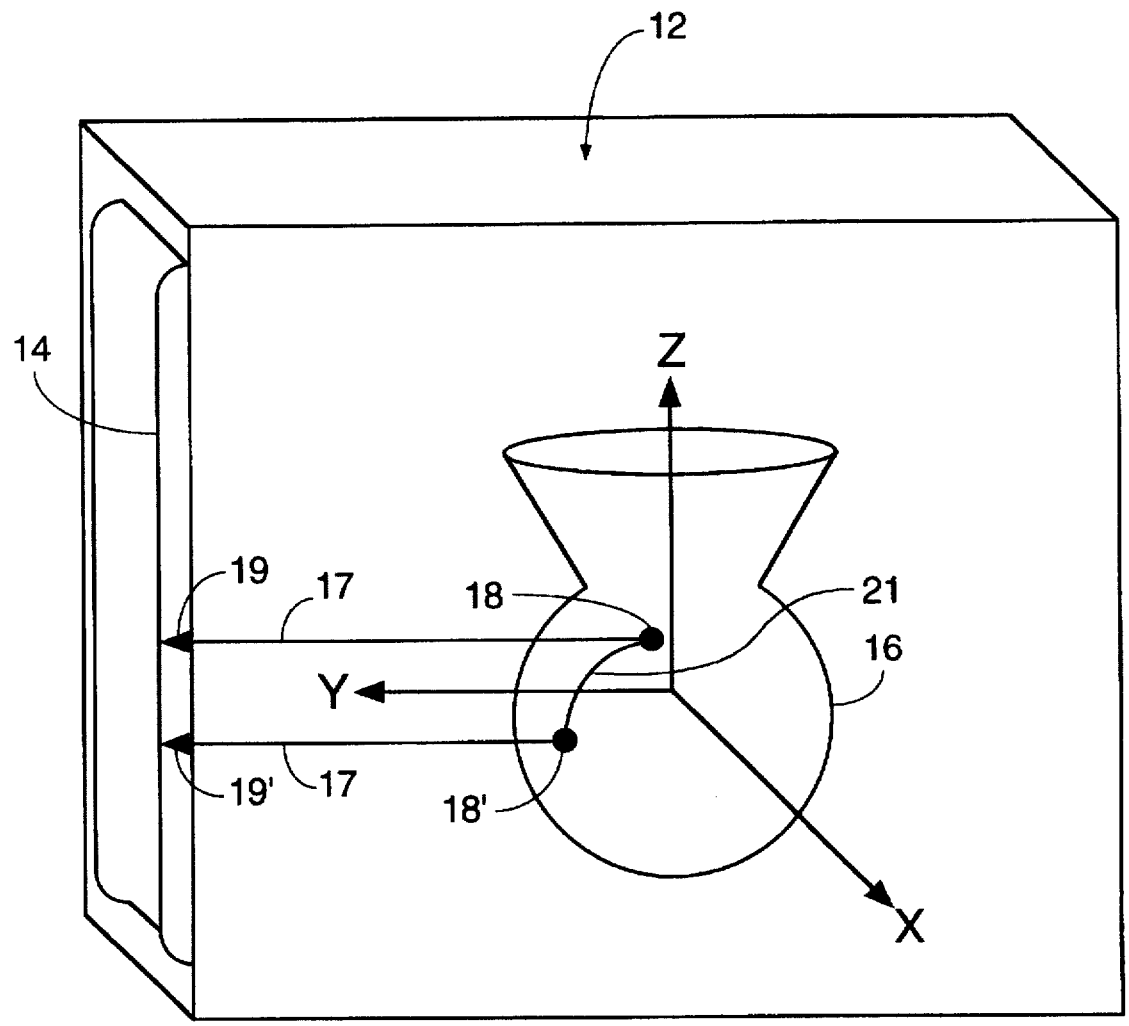
FIG. 2 shows the three coordinate systems of the present invention.

FIG. 2, on the other hand, depicts a side view of the housing of display apparatus wherein the display screen 12 would be viewed through a plane perpendicular to the page. Lens 14 of the display screen 12 is shown as coming out from the front of the display apparatus (the front of which being depicted on FIG. 1).

A three-dimensional vase 16 is depicted inside the display apparatus to illustrate that signals sent from the CPU to the display apparatus represent a three-dimensional image which is projected onto screen 12. The vase object 16 in FIG. 2 is represented in a three-dimensional space, (x,y,z). A (u,v) space can be defined on the surface of the object. For example, to illustrate the surface, between the points 18 and 18' a line 21 is drawn in surface space so that it has the same contour of the object 16.

In a preferred embodiment, an algorithm called a renderer, is used to transform image data in object space to image data in screen space (i.e., Ray Tracer or Z-Buffer). Once transformed, a two dimensional depiction of a three-dimensional object is viewed on display screen 12. To illustrate the vector space transformations, arrow lines 17 originate at points 18, 18' on the object 16 and end at the display screen 12 where the images of points 18 and 18' are projected at points 19 and 19'.

Figure 3:
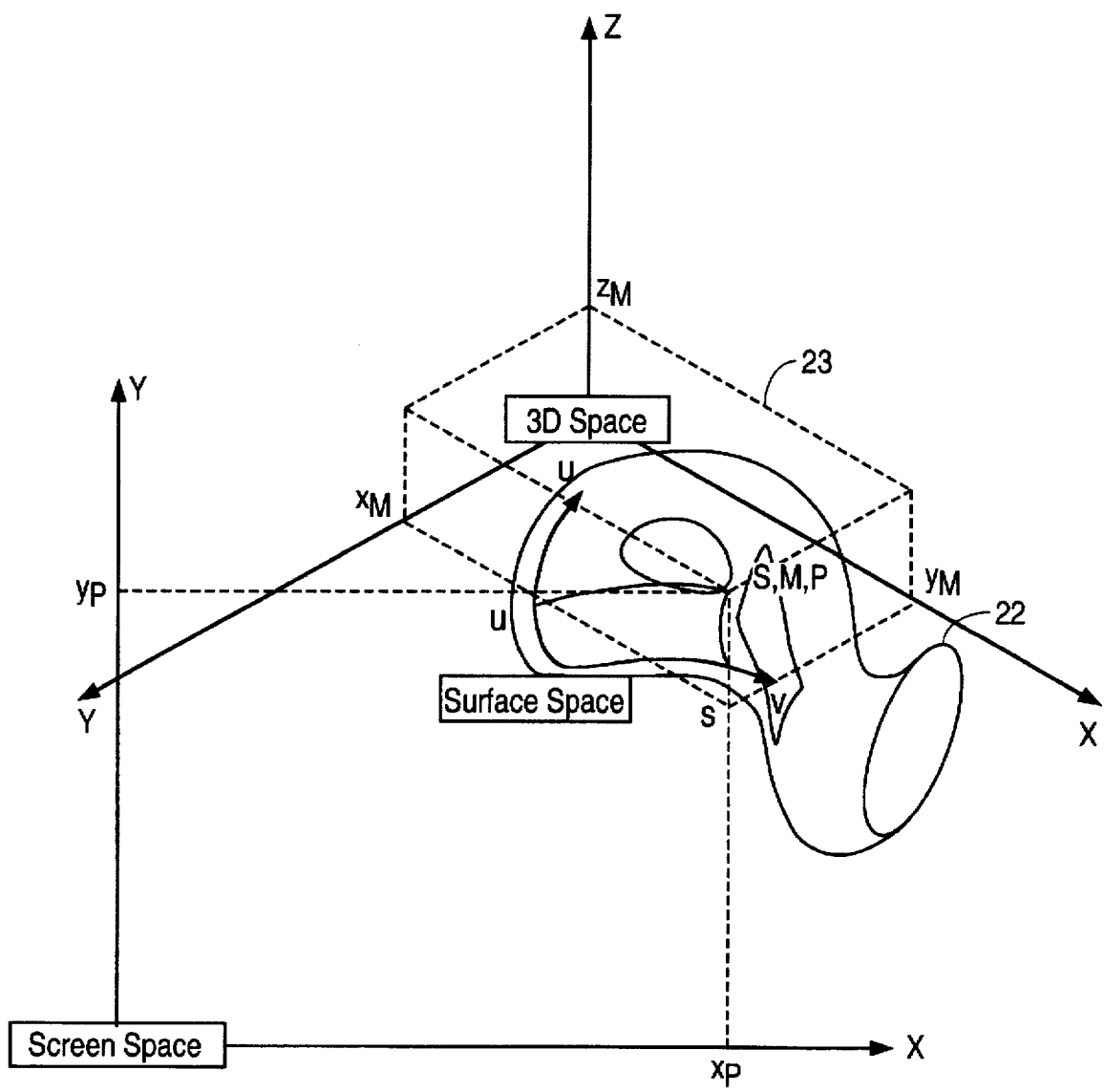
FIG. 3 also shows an object and the three coordinate systems of the present invention from a different angle than that shown in FIG. 2.

In FIG. 3, a 3D object 22 is immersed in three different coordinate systems, that is, display screen space P(x,y), surface space S(x,y) and object space M(x,y,z). Phantom box 23 is used to illustrate the object space. According to the present invention, in most situations, an object can readily be assigned a (u,v) surface space. However, sometimes the object has a surface contour which is difficult to describe. In those situations, a technique know as projection mapping can be used to map the points of object space to surface space. By starting with a known shape like phantom box 23 or a sphere surrounding the object and then projecting the known shape onto the object, coordinates in surface space are provided.

As briefly described above, the present invention includes two space transformations. In accordance with the present invention, a first transformation of vector points in surface space to object space takes place and then a second transformation of vector points in object space to surface space takes place.

Data representing information about the object's appearance in surface space is stored by the system. When an operator of the present invention inputs commands to the CPU, changes are made to the appearance of the object in surface space.

Figure 4:
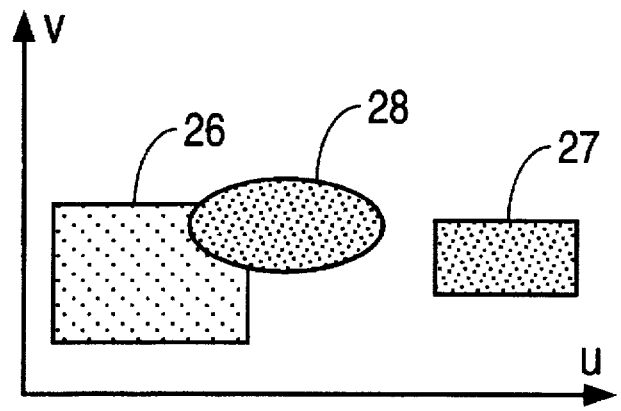
FIG. 4 depicts a two-dimensional coordinate system with a first rectangle alone and a second rectangle overlapping an oval shape.
Figure 5:
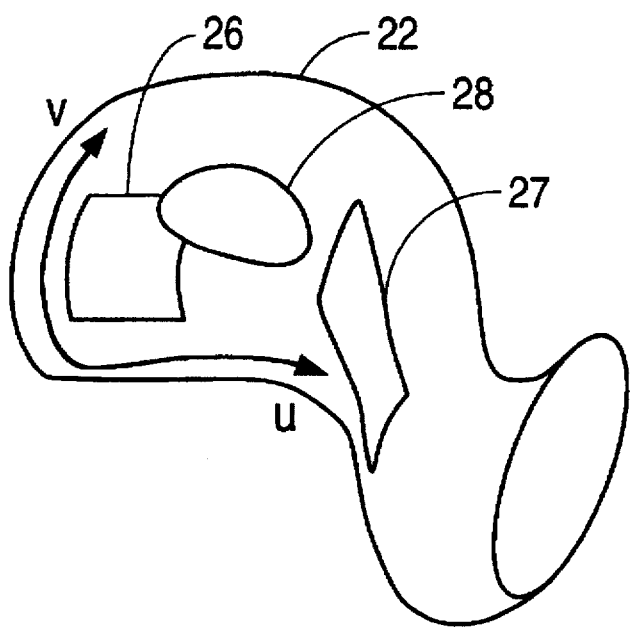
FIG. 5 depicts the shapes of FIG. 3 wrapped around the surface of an object.

To better illustrate surface space, FIG. 4 shows a planar coordinate system (u,v) with two rectangles 26 and 27 and an oval 28 depicted therein. Turning to FIG. 5, the same coordinate system and rectangles and oval are wrapped around object 22, thus forming surface space S(u,v). Note that the object 22 has shading and light illumination, both of which are elements of "appearance." Certain algorithms used to create appearance were discussed above in the background of the invention.

The description of the oval 28 in surface space for example, of FIG. 5, relies on the possibility for any point (x,y,z) of the surface of a 3D object to find a corresponding (u,v) couple of values. The solutions available to define such a (u,v) space depends upon the way the 3D object is defined. The system asks how the object is defined. For example, if the object is defined as a parametric surface, the parameterization of the surface is chosen directly as the mapping function or after a correction to better present geometric distances.

Figure 6:
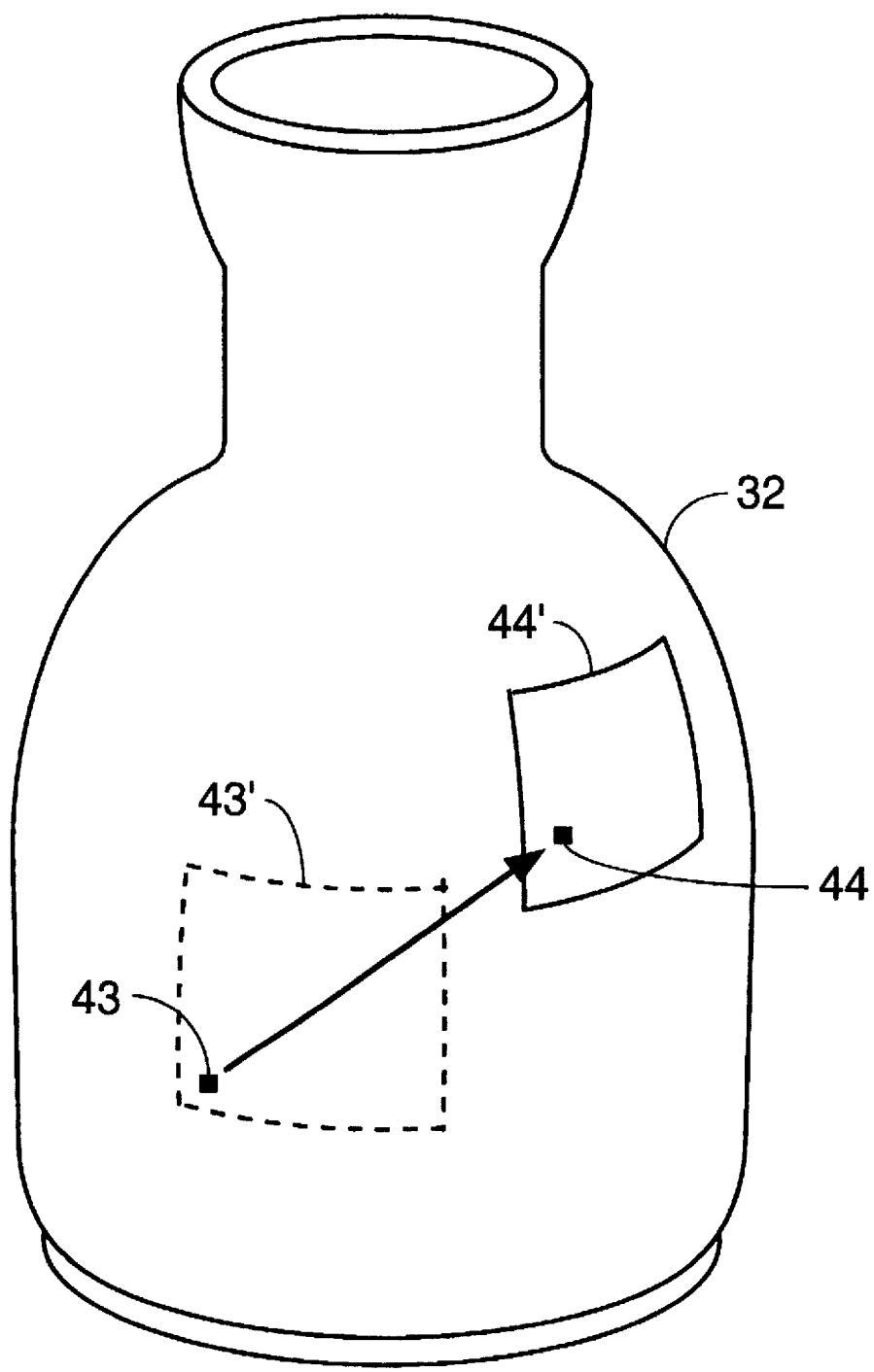
FIG. 6 depicts a rectangle on an object's surface being moved.

Turning to FIG. 6, a vase 32 has a rectangle 43 depicted thereon. After an operator clicks at an initial mouse click position 43 to move rectangle 43' to the current mouse click position 44 to finally position and/or resize rectangle 44'. It is possible in accordance with the present invention to move a defined area on the surface and the appearance associated therewith. The flow chart discussed below provides the method and system for defining a particular contour. With this capability, it is possible to move a contour and its appearance on the surface of an object.

Figure 7:
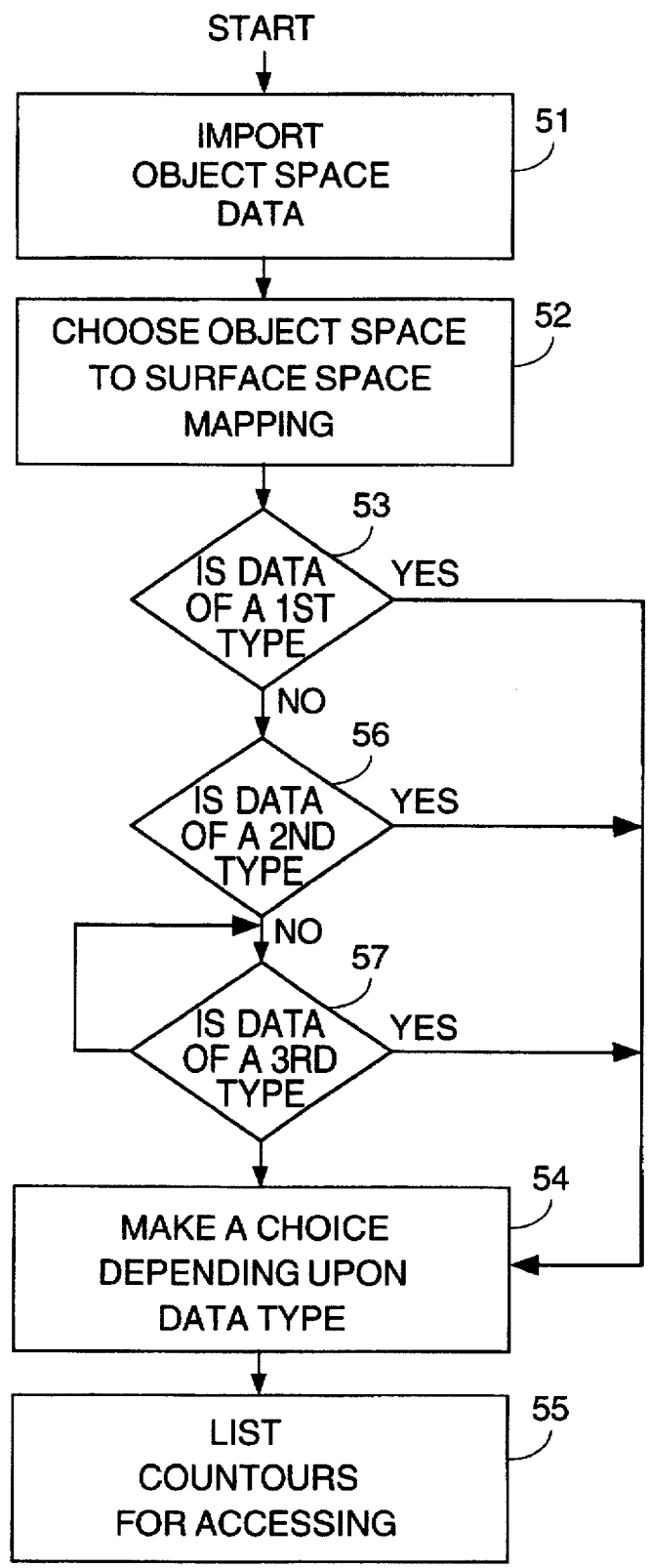
FIG. 7 is a flow chart in accordance with the present invention.

Now turning to FIG. 7, recall that the object space data is imported at box 51. As discussed directly above, the system next chooses the type of object space to surface space mapping in box 52. If the data is not of the first type, then the system asks at box 56 whether the object is a polygon representation with explicit (u,v) values assigned to its vertices, the (u,v) values at any point of the surface calculable by interpolation between the values at the vertices. If it is, the system and method proceeds to box 54.

If the data is not of the second type, then the system asks at box 57 if the object is using other kinds of surfaces (for example, polygon meshes with no explicit (u,v) space) the Bier-Sloan approach, which uses a two step texture mapping through a simple intermediate 3D surface can be applied. If it is, the system and method proceeds to box 57. If not other methods are tried until the system can proceed to box 54.

Thus, once that (x,y,z) is mapped into (u,v), two-dimensional areas in the plane defined by (u,v) coordinate system are defined. Accordingly, these areas are defined by their geometric, resolution-independent contours (i.e., rectangles, ovals, polygons, Bezier curves). This allows the user to define different areas on the surface of a 3D object and assign a different appearance or shader to these areas. The system offers a way to describe resolution independent areas with different appearances.

In accordance with the present invention, the present invention can be integrated into rendering systems as described directly above that uses a lighting model. The areas are assigned an appearance. Appearance is defined as any function which given a point M (defined by a triplet of (x,y,z) coordinates in a 3D coordinate system and/or a couple of (u,v) coordinates in a 2D coordinate system) it is possible to calculate all necessary parameters for the lighting model. The system described is independent from any given lighting model. In a preferred embodiment a Phong model is used, but a Cook-Torrance model or any other model could be used as well. This appearance can include for example, a procedural shader or a set of uniform values. An appearance is called complete if it defines all of the parameters needed by the lighting model used. It is considered partial if it only defines some, but not all, of the parameters need by the lighting model.

A different complete or partial appearance can then be assigned to the interior of each of these contours. These contours are kept in an ordered list at box 55 of FIG. 7. The appearance at a given position is defined using for each of the parameters necessary for the lighting model the value given by the appearance of the first contour in the list overlapping the position that defines this parameter. This is important if two contours, A and B, overlap at a given position. The solution is if contour A defines only transparency and color and B defines reflectivity and color, the transparency of A is used and the reflectivity and color of B are used. If on the other hand, A defines transparency and color and B defines reflectivity and color, the transparency and color of A are used and only reflectivity of B is used.

This procedure can be summarized in pseudo code:

```
At a given position:
set all result shading parameters to undefined.
While not all result shading parameters are defined
    get next contour
    if contour contains the position
        if contour defines parameters not already defined in shading parameters
            set undefined result shading parameters to contour parameters
            values
        end if
    end if
End While.
```

Accordingly, the system and method of the present invention provides the operator with a way to interactively modify these areas and their description through direct manipulation. When the user moves a shading area on the surface of an object, the operator is provided with feedback. Since any contour used in the system (rectangles, ovals, lines, polygons, Bezier curves) can be approximated by yet other polygons via standard contour to polygon conversion techniques, interactive feedback for any contour is dependent on being able to interactively draw a line (polygon segment) on the surface of a 3D object.

Figure 8:
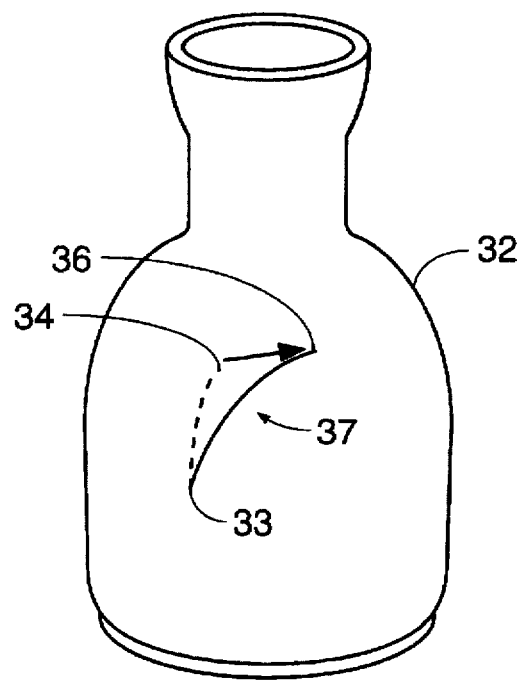
FIG. 8 depicts a line being formed on an object's surface.

FIG. 8 shows a line drawn on the surface of a vase 32. The line is drawn on the surface of the vase by starting at the initial mouse click position point 33 and dragging the mouse to a first position 34, for example. The operator may then move the mouse to a second position 36 and release the mouse button so that line 37 is formed.

Figure 9:
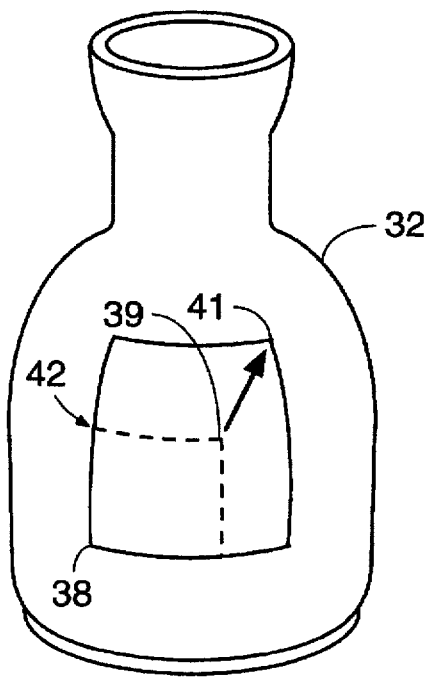
FIG. 9 depicts a rectangle being formed on an object's surface.

Similarly, FIG. 9 shows a rectangle on the surface of vase 32. The rectangle is drawn on the surface of the vase by starting at the initial mouse click position point 38 and dragging the mouse to a first position 39, for example. The operator may then move the mouse to a second position 41 and click there again so that rectangle 42 is formed.

As mentioned above, the appearance description in surface space is stored by the system. By transforming this surface space information into object space information and then into screen space, the present invention provides ability for the operator to experience real-time feedback to his or her commands. Thus the operator is able to move an object along the surface of the object.

Figure 10:
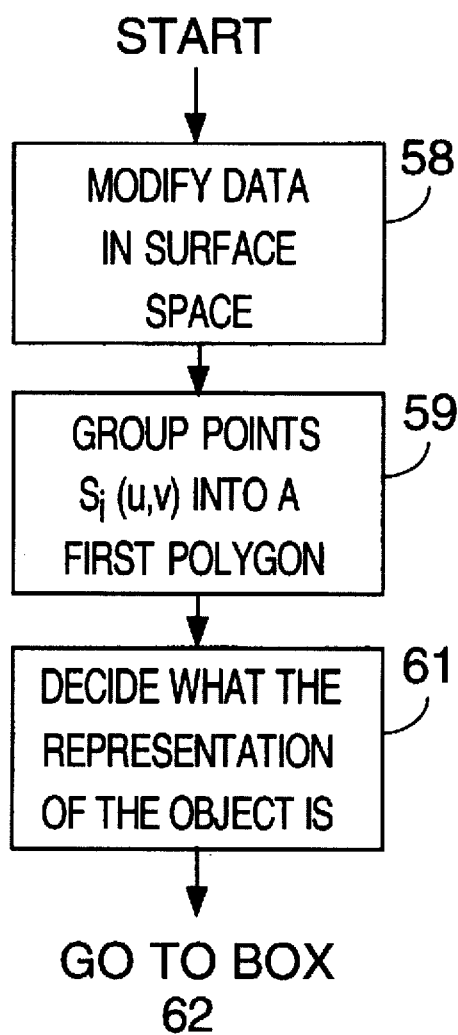
FIG. 10 is a flow chart in accordance with the present invention.
Figure 11:
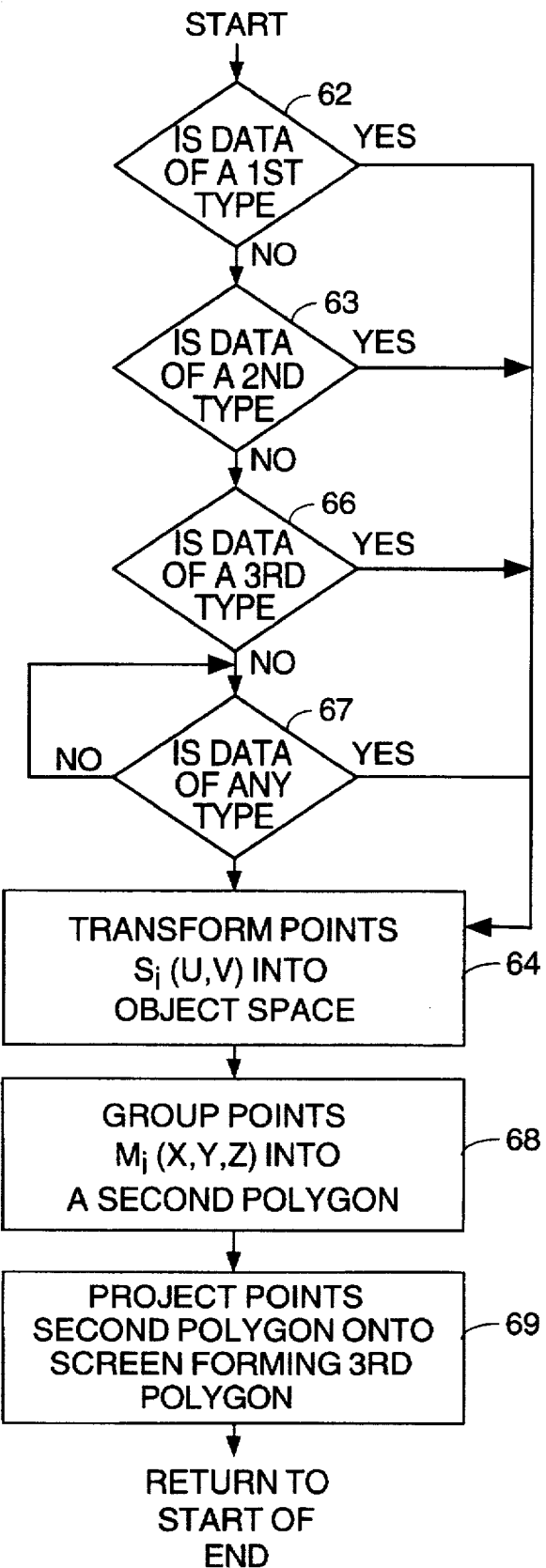
FIG. 11 is a flow chart in accordance with the present invention.

Turning to FIG. 10, there are shown flow charts of how the present invention provides a real-time feedback experience to the operator. Three-dimensional data such as that representing a vase is imported into the system at box 51. Depending upon whether one considers a situation as shown on FIG. 8 and 9 wherein a line or rectangle is drawn onto the surface of an object or the situation like that shown in FIG. 6 wherein an area having preformed shape is moved, different initial steps occur.

Turning to FIG. 10, if the data in surface space S(u,v) is modified at box 58, then for each new line or shape, the line is subdivided into polygons, wherein a first polygon has points a $Si_{i}=1,n$ at box 59. Depending upon the kind of definition used for the 3D object in object space at box 61, the transformation from surface into object space is done differently.

If the data is of a first type at box 62, that is, the object is defined by a polygon list with defined (u,v), a first polygon in the list is found which contains the point $S_i$ in (u,v) space. $M(x,y,z)$ is interpolated using the interpolating factors found in (u,v) space.

If the data is not of the first type, the system and method asks whether the data is of the second type at box 63, that is, whether the object is defined by a polygon mesh with defined points (u,v). The system then uses the same technique as described with reference to box 62, except that an exhaustive search for the polygon that contain $S_i$ can be avoided by precalculating the (u,v) coordinates of each row and column in the mesh and then accessing the appropriate polygon.

If the data is not the second type, the system and method asks whether the data is the third type at box 64, that is, whether the object is defined by a parametric patch mesh. The same techniques that apply for polygon meshes can be applied for this search. But the interpolation is done differently by re-applying the (u,v) parameters to the parametric definition of the chosen patch.

If the data is not the third type, the system and method asks whether the data is the fourth type at box 66, that is, whether the object space to surface space transformation is defined by two way texture mapping. A Ray Tracer is used to find the first 3D intersection between the object and a straight line segment going from the position corresponding to the (u,v) on an intermediate surface used for the mapping and the center used for the two-way texture mapping.

By using one of the above methods, or other suitable methods, the point in surface space $S_i(u,v)$ is assigned to a polygon and those points are transformed to $M_i$ with i varying from 1 to n and those points are assigned to a second polygon. The point of the second polygon are projected to points $P_i$ on the screen and which are accumulated in a third polygon, using for example, a standard perspective projection. A polygon having points P, with i varying from 1 to n in screen space represents the data in the surface space of in box 58 so that it is projected on the screen for the operator to view.

In a system or method of the present invention, any system such as color capable Macintosh or personal computer (PC), including the Macintosh II family, Centris family, Macintosh Quadra family, and most new Macintosh systems with Apple System 6.0.7 with 5 megabytes RAM, or 7.0 software and with 8 megabytes of RAM can be used. No floating point units (FPU) is required.

In a preferred embodiment, file format support includes an Adobe Illustrator or Aldus FreeHand art work. Texture maps include PICT, TIFF, JPEG (QuickTime), Adobe Photoshop 2.0/2.5, or any file format available having a Photoshop acquire plug-in. Models include import and export DXF. Export includes image formats such as PICT, TIFF, EPS, JPEG (QuickTime), Adobe Photoshop, or any format for having a Photoshop export plug-in; support for 14 channels, including the Adobe Photoshop alpha channel. While the described systems are Apple operating systems, other such as IBM compatibles can be used as well.

While the invention has been shown and described in what is presently conceived to be the most practical and preferred embodiment of the invention, it will become apparent to those of ordinary skill in the art that many modifications thereof may be made within the scope of the invention, which scope is to be accorded the broadest interpretation of the claims so as to encompass all equivalent structures and device.

I claim:

1. A method of displaying a representation of a three-dimensional object in real time on a two-dimensional computer screen, comprising the steps of:

generating a two-dimensional set of data points defining a two-dimensional space, each data point in the two-dimensional space having a corresponding point on the surface of the three-dimensional object, and the two-dimensional space having information embedded within the two-dimensional space that characterizes the contour of the three-dimensional object;

associating data with an area in said two-dimensional space corresponding to an area on the three-dimensional object at a selected location, said data being derived from user graphical commands which describe a figure at the selected location on the three-dimensional object, the figure representing an area of predetermined surface characteristics of the surface of the three-dimensional object;

translating the data describing the figure and the contour information from two-dimensional space to corresponding areas on the surface of the three-dimensional object at the selected location; and updating the representation of the three-dimensional object on the computer screen with the, data describing the figure and the contour information to display the three-dimensional object with the figure at the selected location on the three-dimensional object, such that the representation of the figure displayed on the computer screen conforms to the surface of the three-dimensional object at the selected location.

2. The method of claim 1 wherein the features on the surface of the three-dimensional object comprise one of lighting, color, texture and transparency.

3. The method of claim 1 wherein the step of generating a two-dimensional set of data points further comprises the step of selecting a mapping from the three-dimensional object to the two-dimensional space defined by the set of data points based on the surface of the three-dimensional object.

4. The method of claim 3 wherein the translation step further comprises the step of selecting a mapping from the two-dimensional space to the three-dimensional object based on the mapping selected to generate the two-dimensional space.

* * * * *